United States Patent
Berrocal et al.

(10) Patent No.: US 11,725,987 B2
(45) Date of Patent: Aug. 15, 2023

(54) ASSEMBLY FOR SPECTROPHOTOMETRIC MEASUREMENTS

(71) Applicant: Spec-Imaging AB, Lund (SE)

(72) Inventors: Edouard Jean Jacques Berrocal, Lund (SE); William René Serge Chaze, Eslöv (SE); Elias Viktor Kristensson, Bjärred (SE); Jérémie Thouakesseh Zoueu, Yamoussouk (SE)

(73) Assignee: Spec-Imaging AB

( * ) Notice: Subject to any disclaimer, the term of this patent is extended or adjusted under 35 U.S.C. 154(b) by 139 days.

(21) Appl. No.: 17/435,052

(22) PCT Filed: Mar. 2, 2020

(86) PCT No.: PCT/SE2020/050229
§ 371 (c)(1),
(2) Date: Aug. 31, 2021

(87) PCT Pub. No.: WO2020/180233
PCT Pub. Date: Sep. 10, 2020

(65) Prior Publication Data
US 2022/0136900 A1    May 5, 2022

(30) Foreign Application Priority Data

Mar. 2, 2019    (SE) .................................. 1950273-1

(51) Int. Cl.
*G01J 3/433*    (2006.01)
*G01J 3/02*    (2006.01)
(Continued)

(52) U.S. Cl.
CPC ............ *G01J 3/433* (2013.01); *G01J 3/0229* (2013.01); *G01N 21/31* (2013.01);
(Continued)

(58) Field of Classification Search
CPC  G01J 3/0229; G01J 3/433; G01N 2021/6463; G01N 21/255; G01N 21/31;
(Continued)

(56) References Cited

U.S. PATENT DOCUMENTS 6,345,765 B1    2/2002  Wiklof
6,734,968 B1 *  5/2004  Wang ...................... G01J 4/02
                                                        356/369

(Continued)

FOREIGN PATENT DOCUMENTS

CN    101140222    3/2008
EP    2501288      9/2012
(Continued)

OTHER PUBLICATIONS

Patent Cooperation Treaty (PCT), International Search Report and Written Opinion for Application PCT/SE2020/050229 filed Mar. 2, 2020, dated Apr. 24, 2020, International Searching Authority, SE.
(Continued)

*Primary Examiner* — Hina F Ayub
(74) *Attorney, Agent, or Firm* — McDonald Hopkins LLC (57) ABSTRACT

An assembly for measurements of one or more optical parameters of a medium is disclosed. The assembly comprises a light sheet generator, a light intensity modulator, a holder for a sample, and an optical sensor. A method of using the assembly for measuring one or more optical parameters of a medium is also disclosed.

9 Claims, 3 Drawing Sheets (51) Int. Cl.
*G01N 21/31* (2006.01)
*G01N 21/47* (2006.01)
*G01N 21/64* (2006.01)

(52) U.S. Cl.
CPC . *G01N 21/4738* (2013.01); *G01N 2021/6463* (2013.01); *G01N 2201/0635* (2013.01)

(58) Field of Classification Search
CPC .. G01N 21/4738; G01N 21/49; G01N 21/645; G01N 2201/0635; G01N 2201/0675; G01N 2201/0691
See application file for complete search history.

(56) References Cited

U.S. PATENT DOCUMENTS

| | | | |
|---|---|---|---|
| 2009/0103085 | A1 | 4/2009 | Hu |
| 2009/0290153 | A1* | 11/2009 | Juhl .................. G01N 21/0303 356/246 |
| 2018/0267289 | A1 | 9/2018 | Kalkbrenner et al. |

FOREIGN PATENT DOCUMENTS

| | | |
|---|---|---|
| GB | 2080947 | 2/1982 |
| JP | 5754827 | 4/1982 |
| JP | 2005517195 | 6/2005 |
| JP | 2010160025 | 7/2010 |
| JP | 2018531396 | 10/2018 |
| JP | 2018205005 | 12/2018 |
| WO | 2012015344 | 2/2012 |

OTHER PUBLICATIONS

Swedish Search Report for Application 1950273-1, dated Sep. 11, 2019, 9 pgs., Swedish Patent Office, Sweden.

Supplementary European Search Report dated Sep. 2, 2022; European Patent Application No. 20765897.2 filed Mar. 2, 2020.

Kiefer J: "Using a supercontinuum light source for instantaneous excitation-emission fluorescence mapping", Measurement Science and Technology, IOP, Bristol, GB, vol. 28, No. 6, Apr. 7, 2017 (Apr. 7, 2017), p. 67001, XP020316697.

McGregor T et al: "Laser-based volumetric flow visualization by digital color imaging of a spectrally coded volume", Review of Scientific Instruments, American Institute of Physics, 2 Huntington Quadrangle, Melville, NY 11747, vol. 79, No. 1, Jan. 30, 2008 (Jan. 30, 2008), pp. 13710-13710, XP012114558.

Kristensson E and Berrocal E: "Crossed patterned structured illumination for the analysis and velocimetry of transient turbid media", Scientific Reports, vol. 8, No. 1, Aug. 6, 2018 (Aug. 6, 2018), XP055581732.

* cited by examiner

ASSEMBLY FOR SPECTROPHOTOMETRIC MEASUREMENTS

CROSS-REFERENCE TO RELATED APPLICATION

This application is a 35 U.S.C. § 371 national stage application of PCT Application No. PCT/SE2020/050229 filed on Mar. 2, 2020, entitled "ASSEMBLY FOR SPECTROPHOTOMETRIC MEASUREMENTS OF TURBID SAMPLES USING A POLYCHROMATIC RECTANGULAR LIGHT SHEET," which claims priority to Swedish Patent Application No. 1950273-1 filed on Mar. 2, 2019, each of which are incorporated herein in their entirety by reference.

TECHNICAL FIELD

The present disclosure relates to the field of spectrophotometric measurements.

BACKGROUND

In some conventional approaches to spectrophotometric measurements, monochromatic light (e.g., selected from a polychromatic light source) is used to illuminate a medium under examination, and a photodetector is placed on the opposite side of the medium compared to the illuminated side to record the remaining light intensity after passing through the sample. An absorption or attenuation coefficient of the medium may be determined for the wavelength of the monochromatic light by calculating a ratio between light intensity before and after passing of the sample.

More elaborate approaches to spectrophotometric measurements are also known. For example, a system for measuring optical properties of a medium, which applies monochromatic light, is described in WO 2012/015344 A1. There, spatially modulated illumination is employed to mark incident illumination, allowing unwanted multiply scattered light to be suppressed.

A problem with prior art solutions to spectrophotometric measurements is efficiency for performing the measurements and accuracy of the archived results.

Therefore, there is a need for alternative approaches to spectrophotometric measurements. The need may be particularly prominent for measurements on turbid media.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an assembly is referred to herein, it is to be understood as a physical product; e.g., an apparatus. The physical product may comprise one or more parts. In some embodiments the parts may comprise controlling circuitry in the form of one or more controllers, one or more processors, or the like.

It is an object of some embodiments to solve or mitigate, alleviate, or eliminate at least some of the above or other disadvantages.

According to a first aspect, this is achieved by an assembly for measurements of one or more optical parameters of a medium. The assembly comprises a light sheet generator configured to provide a polychromatic light sheet comprising a light spectrum extending in a first spatial dimension, wherein the polychromatic light sheet has a propagation path in a second spatial dimension. The light sheet generator comprises a light source configured to provide white light, a dispersive element configured to spread the white light in the first spatial dimension to provide the light spectrum, and an optical slit extending in the first spatial dimension configured to provide the polychromatic light sheet by limitation of the spread white light. The assembly also comprises a light intensity modulator configured to provide an intensity modulated polychromatic light sheet by applying—to the polychromatic light sheet—an intensity modulation having a periodical (or substantially periodical) pattern in the first spatial dimension. The assembly further comprises a holder for a sample of the medium, configured to enable the intensity modulated polychromatic light sheet to illuminate the sample, and an optical sensor configured to record intensity of light exiting the sample over the light spectrum for provision of the one or more optical parameters.

In some embodiments, the periodical pattern is selected from a plurality of periodical patterns available to the light intensity modulator, wherein at least one of the periodical patterns is phase shifted in relation to another one of the periodical patterns in the first spatial dimension.

In some embodiments, the light intensity modulator comprises a liquid crystal display (LCD).

In some embodiments, the dispersive element may be tiltable according to some embodiments, for varying a range of the light spectrum of the polychromatic light sheet.

In some embodiments, the optical sensor is configured to record the intensity of light exiting the sample substantially orthogonal to the polychromatic light sheet and/or to record the intensity of light exiting the sample opposite to the illumination. The light exiting the sample opposite to the illumination may be referred to as the transmitted light.

In some embodiments, the assembly further comprises an optical reflector in the propagation path of the polychromatic light sheet along the second spatial dimension. The optical reflector is configured to reflect—towards the optical sensor—light of the intensity modulated polychromatic light sheet exiting the sample opposite to the illumination.

In some embodiments, the optical sensor is configured to record the intensity of light exiting the sample substantially orthogonal to the polychromatic light sheet. In some of these embodiments, the optical sensor is configurable to switch between recording light intensity variations along an entire width of the sample and recording light intensity variations along a part of the width of the sample. The assembly may then comprise a light sheet resizer configured to provide the intensity modulated polychromatic light sheet in one of a plurality of available extensions in the first spatial dimension.

In some embodiments, the assembly further comprises two or more displaceable monochromatic filters configured to provide spatial calibration of the light spectrum.

A second aspect is a method of using the assembly according to the first aspect for measuring one or more optical parameters of a medium. The method comprises providing the holder with a sample of the medium, illuminating the sample by the intensity modulated polychromatic light sheet provided by the light sheet generator and the light intensity modulator of the assembly, recording (by the optical sensor of the assembly) at least one image of intensity of light exiting the sample opposite to the illumination and intensity of light exiting the sample substantially orthogonal to the polychromatic light sheet, and determining the one or more optical parameters based on the recorded at least one image.

In some embodiments, any of the above aspects may additionally have features identical with or corresponding to any of the various features as explained above for any of the other aspects.

An advantage of some embodiments is that alternative approaches to spectrophotometric measurements are provided.

An important advantage of some embodiments is that a possibility is provided of obtaining spectrophotometric measurements in optically dense turbid media. This advantage is due to the use of a spatially modulated polychromatic light sheet.

Another advantage of some embodiments is due to the use of a polychromatic light sheet, measurements can be made efficient since scanning through all wavelengths of interest is avoided.

When an LCD is used as light intensity modulator, the flexibility of the modulation is improved. Virtually any modulation pattern can be applied using an LCD (the same may be true for other spatial beam modulators/shapers); only limited by the pixel resolution and pixel arrangement of the LCD.

When grating is used as light intensity modulator, each modulation pattern must be provided by a dedicated grating (on individual grating entities or on different parts of a same grating entity). When grating is used as light intensity modulator, application of different modulations (patterns and/or phases) requires replacement of the grating entity and/or precision movement of the grating entity.

Thus, efficiency and/or accuracy may also be improved by using an LCD as light intensity modulator.

Yet another advantage of some embodiments is that the assembly for measurements is compact and relatively easy to relocate.

Yet an advantage of some embodiments is that a single optical sensor (e.g., a single optical recording device such as a camera) may be used to record the intensity of light exiting the sample substantially orthogonal to the polychromatic light sheet and the intensity of light exiting the sample opposite to the illumination; either in a single recording using a reflector, or in two different recordings between which the optical sensor is moved between two different locations. An alternative to the latter is to use two (stationary) optical sensors, one at each of the two different locations, wherein one of the sensors records the intensity of light exiting the sample substantially orthogonal to the polychromatic light sheet and the other sensor records the intensity of light exiting the sample opposite to the illumination.

Yet a further advantage of some embodiments is that accurate measurements may be achieved for optical characteristics over a wide range of values. For example:

- by using the reflector (or by placing the optical sensor opposite to the illumination), it is possible to accurately measure the intensity of light passing through the sample, which is needed for determination of the absorption of non-scattering/emitting media,
- by zooming in to reduce the recording area of the optical sensor and applying the resizing functionality for the polychromatic light sheet, it is possible to accurately measure attenuation for turbid media (e.g., highly turbid media).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, many conventional approaches to spectrophotometric measurements uses successively applied monochromatic beams to illuminate the sample of the medium under examination. To acquire information for more than one wavelength, a scan through all wavelengths of interest needs to be performed. Such approaches may be inefficient for performing measurements.

Another approach to spectrophotometric measurements is described in "Quantitative measurements of turbid liquids via structured laser illumination planar imaging where absorption spectrophotometry fails"; Regnima, et al.; Applied Optics, vol. 56, no. 13, May 2017, pp. 3929-3938, where two lasers are used having wavelengths 450 nm and 638 nm, respectively, and activating one laser at a time for measurements.

Yet another approach to spectrophotometric measurements is described in WO 2012/015344 A1.

Furthermore, "Using a supercontinuum light source for instantaneous excitation-emission fluorescence mapping"; Kiefer; Measurement Science and Technology, no. 28, 2017, describes using a supercontinuum light source and a transmission grating to disperse the light in a measurement volume. A problem with this approach is that the optical property of interest may not always be accurately measured. This problem may be especially prominent in turbid media when scattering effects occurs. A few example problems that may be experienced with this approach is that it may be impossible to separate primary scattering (a.k.a. single scattering) from higher scattering orders, and that scattering of one light wavelength may contaminate a recording area for another light wavelength. For scattering media it may be impossible to make any relevant measurements at all using this approach.

In the following, embodiments will be described whereby efficient and accurate measurements are enabled. Furthermore, some embodiments provide increased flexibility in measuring optical properties of the medium under examination. Thereby, accurate measurements can be carried out by the same assembly for media having a wide range of various optical properties.

Generally, the term "measurements" may, for example, refer to spectrophotometric measurements.

Also generally, the term "optical parameters" may refer to any suitable optical parameter describing an optical property; such as, for example, an absorption coefficient, an attenuation coefficient (a.k.a. an extinction coefficient), a scattering coefficient, a fluorescence quantum yield (QY), a phosphorescence quantum yield (QY), etc. The extinction coefficient equals the sum of the absorption coefficient and the scattering coefficient. Other examples of optical properties include properties linked to one or more of: a concentration, an averaged cross-section, and a particle size (if there are particles in the medium). Thus, these parameters may also be derived. Hence, measuring an optical parameter may be defined as measuring an (the corresponding) optical property.

Also generally, the term "medium" may, for example, refer to a liquid, a gel, a solid medium, or a gas. Some common applications include liquid media. Some embodiments may be particularly suitable for measurements in relation to turbid and/or emitting media, wherein turbid includes scattering and absorption and emission includes photoluminescence (e.g., fluorescence and/or phosphorescence).

Also generally, exemplification by scattering is meant to be relevant also for emission of photoluminescing media, and vice versa.

Also generally, the term "light" refers to electromagnetic radiation having a wavelength within a certain range. This range may comprise what is commonly referred to as visible light (i.e., a portion of the electromagnetic radiation spectrum that is visible to the human eye).

Alternatively or additionally, this range may comprise what is commonly referred to as non-visible light (i.e., a portion of the electromagnetic radiation spectrum that is not visible to the human eye), for example infrared (IR) light and/or ultraviolet (UV) light. The term "illumination" refers to irradiation by light as defined above.

Also generally, the term "polychromatic" describes something comprising two or more (visible or non-visible) wavelengths of the electromagnetic radiation spectrum.

Also generally, the term (single) optical sensor may refer to an array/matrix of constituent optical sensors (such as a digital camera where each pixel has a corresponding constituent optical sensor; an optical detector) or to a single optical sensor element (a single optical detector) that is configured to sweep over a recording area.

Figure 1:
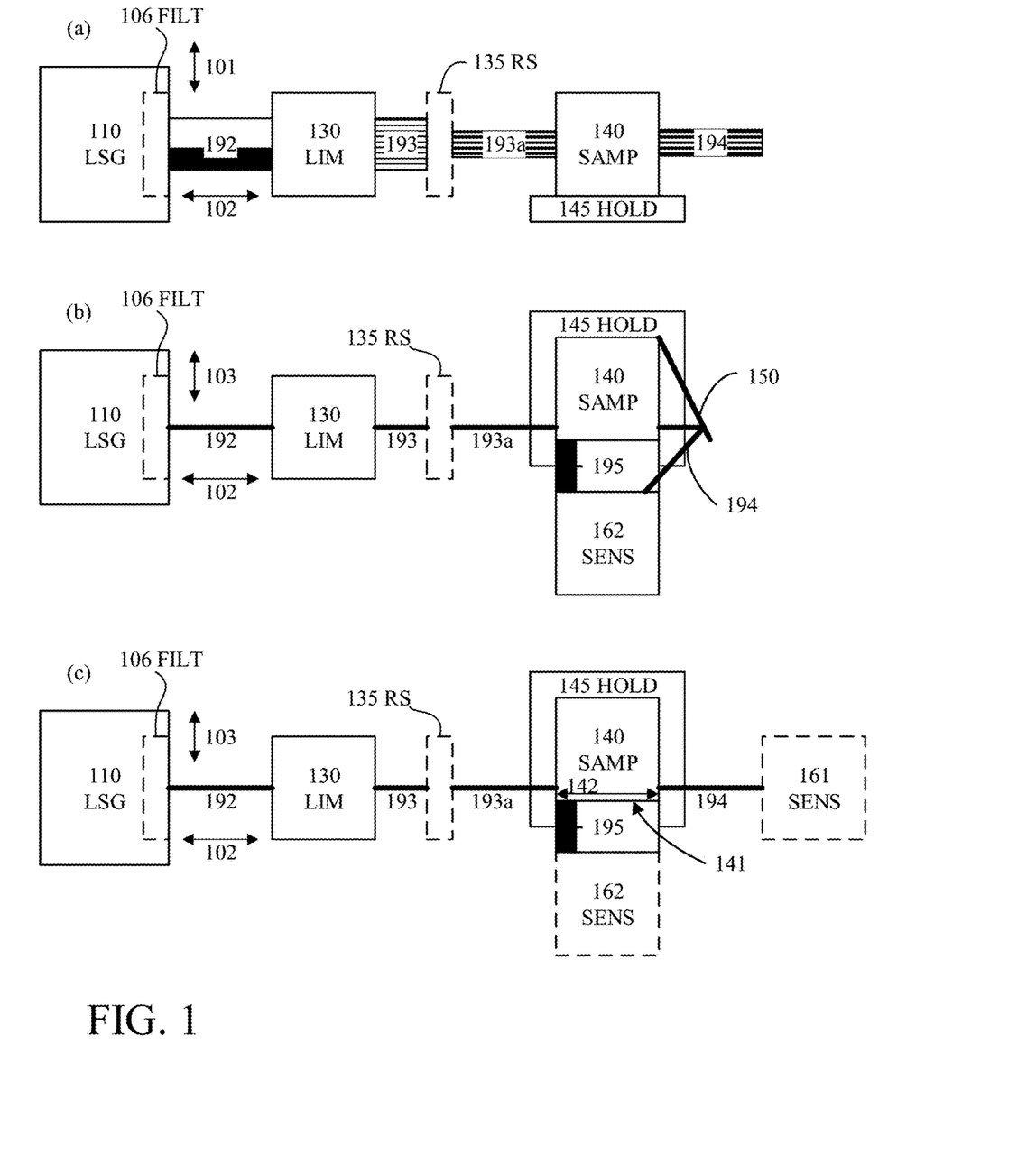
FIG. 1 is a schematic block diagram illustrating an example assembly according to some embodiments.

FIG. 1 schematically illustrates an example assembly according to some embodiments, for measurements of one or more optical parameters of a medium. Part (a) illustrates a side wave of one variant of the assembly and parts (b) and (c) illustrate respective top views of two different variants of the assembly.

The assembly comprises a light sheet generator (LSG) 110, a light intensity modulator (LIM) 130, a holder (HOLD) 145 for a sample (SAMP) 140 of the medium, and an optical sensor (SENS) 161, 162.

The light sheet generator 110 is configured to provide a polychromatic light sheet 192, which comprises a light spectrum extending in a first spatial dimension 101 and has a propagation path in a second spatial dimension 102.

The second spatial dimension is non-parallel (typically orthogonal) to the first spatial dimension (e.g., in Euclidean coordinates). Together with a third spatial dimension 103 (which is non-parallel, typically orthogonal, to the first spatial dimension and to the second spatial dimension), the first and second spatial dimension spans a three-dimensional space. The terms "spatial dimension" and "dimension" will be used interchangeably herein.

A light sheet may, for example, be defined as light propagating along two or more paths in a single plane (e.g., in Euclidean coordinates).

That the light spectrum extends in the first spatial dimension may be understood as a light wavelength variation, which has the property that each coordinate along a path in the first spatial dimension experiences at most one wavelength of light.

Figure 2:
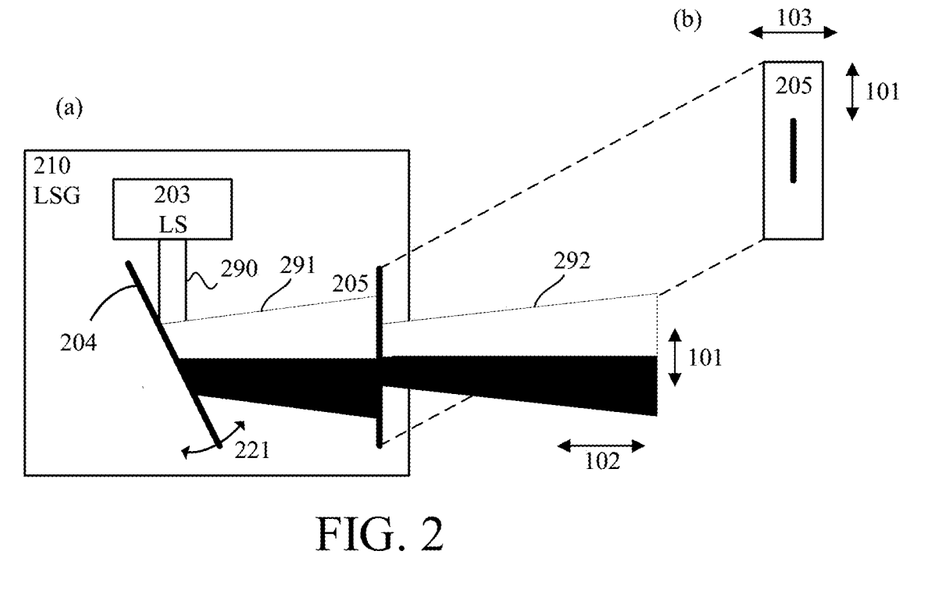
FIG. 2 is a schematic block diagram illustrating an example light sheet generator according to some embodiments.

FIG. 2 schematically illustrates an example light sheet generator (LSG) 210 according to some embodiments. The light sheet generator 210 may, for example, be used as the light sheet generator 110 of FIG. 1. Part (a) of FIG. 2 illustrates a view of the light sheet generator in a plane extending in the first 101 and second 102 dimension.

The example light sheet generator 210 comprises a light source (LS) 203, a dispersive element (e.g., a diffraction grating or a prism) 204, and an optical slit 205 extending in the first spatial dimension 101.

Preferably, the optical slit may be placed as close as possible to the sample of the medium to preserve the light sheet over the distance between light sheet generator and the sample of the medium. This may be inherently achieved by an approach where the optical slit is an imprint on the container for the sample.

An alternative to using an optical slit is use of a cylindrical lens. Preferably, the cylindrical lens may be placed at a distance from the sample of the medium, that equals the focal distance of the lens.

The light source (e.g., a light-emitting diode—LED) 203 is configured to provide white light, or any other suitable multi-wavelength light.

The light 290 provided by the light source illuminates the dispersive element, and the dispersive element is configured—e.g., by its orientation—to spread the light 290 provided by the light source in the first spatial dimension 101 to provide spread light in the form of a light spectrum 291.

At least part of the light spectrum (the dispersed beam) 291 illuminates the optical slit 205, and the optical slit is configured to provide the polychromatic light sheet 292 by limitation—at least in the third dimension 103—of the spread light 291 provided by the dispersive element. Thus, the polychromatic light sheet 292 provided by the optical slit 205 has a propagation path in the second spatial dimension 102 and comprises a light spectrum extending in the first spatial dimension 101. Part (b) of FIG. 2 illustrates a view of the optical slit in a plane extending in the first 101 and third 103 dimension.

In some embodiments, the dispersive element 204 is tiltable as illustrated at 221; typically around a tilting axis extending in the third dimension. Thereby, it can be varied which part of the light spectrum 291 illuminates the optical slit, and hence the range of the light spectrum of the polychromatic light sheet 292.

Even though not visible in FIG. 1, the propagation paths of the different wavelengths may not be entirely parallel.

Thus, the polychromatic light sheet 192 may, for example, have a larger extension in the first dimension 101 in its rightmost part in FIG. 1 than in its leftmost part. This is illustrated in FIG. 2 for the spread light 291 and the polychromatic light sheet 292.

In some embodiments, the light sheet generator 210 may additionally comprise further elements, for example, a diaphragm and one or more optical lenses for collimating (i.e., parallelizing) the light 290 provided by the light source.

Alternatively or additionally, the light sheet generator 210 may additionally comprise two or more (typically four, five, or six) displaceable monochromatic filters (or filters with a relatively narrow bandwidth), illustrated as 106 in FIG. 1. In some embodiments, the displaceable monochromatic filters may be placed at another location of the assembly, not comprised in the light sheet generator.

One of the monochromatic filters may be applied in the light path to spatially calibrate the light spectrum for measurements (e.g., to determine a mapping between a particular light wavelength—provided by the applied filter—and a location in the sample of the medium and the direction of propagation of the diverging light sheet). The calibration may be repeated for one or more other ones of the monochromatic filters. When the measurements are performed, the monochromatic filters are typically removed from the light path. The filters may, for example, be provided on a filter wheel or other means for easy application and removal.

It may be preferable to place the displaceable monochromatic filters close to the light source 203 since then the filters may be small and thereby less expensive. However, any placement in the light path between the light source and the optical sensor (via the sample of the medium) may be possible.

The light intensity modulator 130 is configured to provide an intensity modulated polychromatic light sheet 193, 193a by applying (to the polychromatic light sheet) an intensity modulation having a periodical—or substantially periodical—pattern in the first spatial dimension.

Examples of periodical patterns include patterns defined by a Ronchi ruling—i.e., a constant-interval bar and space square wave (e.g., equaling a when $2kb \leq x < (2k+1)b$, and equaling c when $(2k+1)b \leq x < (2k+2)b$, $k \in \mathbb{Z}$)—and patterns defined by a sinusoidal function. Examples of substantially periodical patterns include any pattern that alters between values below its mean value and values above its mean value in a certain periodicity over x, but where the values below its mean value and/or the values above its mean value can be different for different periods. Another example of a substantially periodical pattern is a pattern with a slight periodicity shift along x.

Figure 3:
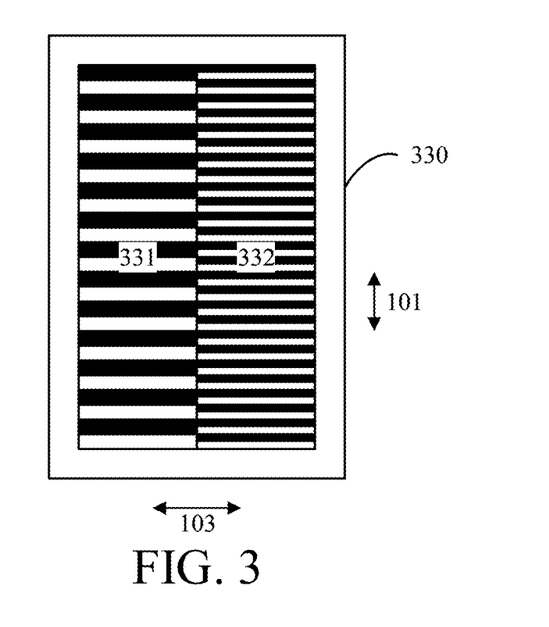
FIG. 3 is a schematic block diagram illustrating an example light intensity modulator according to some embodiments.

The light intensity modulator may, for example, be a Ronchi grating. One example Ronchi grating 330 is illustrated in FIG. 3. The Ronchi grating may comprise a single periodical pattern or a plurality of different periodical patterns. The example grating 330 is illustrated as comprising two different periodical patterns 331 and 332 with different periodicity. The grating may be movable to select one of the plurality of different periodical patterns for application. In the example of FIG. 3, the grating would be movable in the third dimension 103 for this purpose. Furthermore, the grating may be movable in the first dimension 101 to provide a phase shift of the selected periodical pattern.

Alternatively or additionally, the light intensity modulator may, for example, be an imprint on a container (e.g., a glass cuvette) for the sample of the medium. The imprint may comprise a single periodical pattern or a plurality of different periodical patterns (e.g., on different sides of the container).

The holder 145 and/or the container may be movable (e.g., rotatable around an axis extending in the first dimension) to select one of the plurality of different periodical patterns for application. Furthermore, the holder 145 and/or the container may be movable in the first dimension 101 to provide a phase shift of the selected periodical pattern.

Yet alternatively or additionally, the light intensity modulator may, for example, be a liquid crystal display (LCD). An advantage of using an LCD for this purpose is that different periodical patterns and/or phase shifts of the selected periodical pattern may be provided without mechanical movement. Furthermore, the flexibility of the modulation is improved. Virtually any modulation pattern can be provided using an LCD; only limited by the pixel resolution and pixel arrangement of the LCD. For example, the pixel resolution poses a lower limit on the period length of the pattern (two pixels per period). Furthermore, if n phase shifts are to be applied, the pixel resolution also poses a lower limit on the period length of the pattern (n pixels per period).

Typically two or more (e.g., three) phases are applied for different recordings to enable determination of an optical parameter. Also typically, each phase shift corresponds to a displacement of the modulation by a distance corresponding to the period of the modulation divided by the number n of recordings.

It may be preferable to have the light intensity modulator located as close to the sample as possible, to preserve the spatial modulation until the modulated light sheet enters the sample. This is inherently achieved by the approach where the light intensity modulator is an imprint on the container for the sample.

Referring again to FIG. 1, the holder 145 for the sample 140 of the medium is configured to enable the intensity modulated polychromatic light sheet to illuminate the sample. For example, the holder may be located in relation to the light intensity modulator and the light sheet generator such that, when the sample is provided at the holder, the intensity modulated polychromatic light sheet illuminates the sample.

Typically, the entire intensity modulated polychromatic light sheet illuminates the sample, but some embodiments may apply a solution where only part of the intensity modulated polychromatic light sheet illuminates the sample.

Preferably, the holder is configured such that the illumination of the sample is close to a side 141 of the sample that faces the optical sensor 162. This decreases the distance for the primarily scattered light (i.e., the single light scattering) to travel through the sample to reach the optical sensor.

The holder may, for example, be a stand for receiving the sample. The sample may be provided without any container (e.g., if the medium is solid, or a gel). Alternatively, the sample may be provided in a container (e.g., if the medium is liquid, or a gas), in which case the holder may be suitable for receiving the container with the sample comprised therein. An example container is a cuvette (e.g., a glass cuvette).

The optical sensor 161, 162 is configured to record (over the light spectrum) intensity of light exiting the sample. The recorded intensity can then be used to determine the one or more optical parameters.

Typically, the optical sensor may be a camera (e.g., a charge-coupled device—CCD—camera or a scientific complementary metal-oxide-semiconductor—sCMOS—camera).

The optical sensor 161, 162 is configured to record the intensity of light exiting the sample opposite to the illumination (so called transmitted light, illustrated as 194 in FIG.

1) and/or to record the intensity of light exiting the sample substantially orthogonal to the polychromatic light sheet (scattered or photoluminescence light, illustrated as 195 in FIG. 1).

Recording the intensity of light 195 exiting the sample substantially orthogonal to the polychromatic light sheet may be achieved by placing the optical sensor such that a straight line through the sample and the optical sensor is substantially orthogonal to the polychromatic light sheet, i.e., extends in the third dimension. This is illustrated by the optical sensor placement 162 in parts (b) and (c) of FIG. 1.

Recording the intensity of light 194 exiting the sample opposite to the illumination may be achieved by placing the optical sensor such that a straight line through the sample and the optical sensor is parallel to propagation of the polychromatic light sheet, i.e., extends in the first dimension. This is illustrated by the optical sensor placement 161 in part (c) of FIG. 1.

A single optical sensor may be movable between the positions 161 and 162 illustrated in part (c) of FIG. 1, for recording of the intensity of light exiting the sample opposite to the illumination and the intensity of light exiting the sample substantially orthogonal to the polychromatic light sheet. Alternatively, two optical sensors may be used, one in positions 161 for recording of the intensity of light exiting the sample opposite to the illumination and one in position 162 for recording of the intensity of light exiting the sample substantially orthogonal to the polychromatic light sheet.

Recording the intensity of light 194 exiting the sample opposite to the illumination may, alternatively, be achieved by letting the assembly further comprise an optical reflector 150 in the propagation path of the polychromatic light sheet along the second spatial dimension, where the optical reflector is configured to reflect the light 194 of the intensity modulated polychromatic light sheet exiting the sample opposite to the illumination towards the optical sensor 162. Such an approach is illustrated in part (b) of FIG. 1. The reflector may, for example, be a mirror or a diffusive glass layer.

According to this approach, a single, stationary optical sensor may be used for recording of the intensity of light exiting the sample opposite to the illumination and the intensity of light exiting the sample substantially orthogonal to the polychromatic light sheet; possibly in a single recording.

In some embodiments, this approach may further comprise an attenuator (e.g., a neutral density filter) or amplifier in the light path between the reflector and the optical sensor, to provide the light exiting the sample opposite to the illumination and the light exiting the sample substantially orthogonal to the polychromatic light sheet at similar intensity at the optical sensor. This avoids saturating the optical sensor while enabling recording of relatively small intensity variations. Other ways to avoid saturating the optical sensor while enabling recording of relatively small intensity variations include recording of the intensity of light exiting the sample opposite to the illumination and the intensity of light exiting the sample substantially orthogonal to the polychromatic light sheet in different recordings and varying the optical sensor exposure time and/or the light source intensity between recordings.

When recording the intensity of light 195 exiting the sample substantially orthogonal to the polychromatic light sheet (optical sensor placement 162) the optical sensor may typically be able to measure light intensity variations along an entire "width" 142 of the sample ("width" being an extension in the second dimension).

In some embodiments, the optical sensor recording the intensity of light exiting the sample substantially orthogonal to the polychromatic light sheet may be further configured to switch between recording light intensity variations along the entire width 142 of the sample and recording light intensity variations along a part of the width of the sample. The part is typically the part closest to the illumination of the sample. In some embodiments, the optical sensor may be configured to vary the size of the part. This feature may be achieved, for example, by use of a zooming function for the optical sensor, e.g., an objective lens, a telecentric objective, a zoom lens, or similar.

In connection to this approach of recording light intensity variations along a part of the width of the sample, it may be beneficial to let the assembly comprise a light sheet resizer (RS) 135, configured to provide the intensity modulated polychromatic light sheet in one of a plurality of available extensions in the first spatial dimension (e.g., in one of a plurality of available sizes or scales). This is illustrated in part (a) of FIG. 1 as the light sheet resizer shrinking the initial intensity modulated polychromatic light sheet 193 to provide a resized intensity modulated polychromatic light sheet 193*a* that has a smaller extension in the first spatial dimension. Thus, when the optical sensor zooms in to a part of the width of the sample (and inherently to a part of the "height" of the sample, "height" being an extension in the second dimension), the resized intensity modulated polychromatic light sheet 193*a* may be formed such that it can still be recorded in entirety by the optical sensor. The light sheet resizer 135 may, for example, be implemented by suitable application of one or more lenses and a Fourier filtering.

As mentioned above, the propagation paths of the different wavelengths may not be entirely parallel. Thus, another way to achieve a resized intensity modulated polychromatic light sheet 193*a* is to place the light intensity modulator directly next to the sample and vary the distance between the light sheet generator and the light intensity modulator (e.g., by moving the light sheet generator and/or the a part assembly comprising the light intensity modulator, the holder and the optical sensor). Then, the variation of the width of the polychromatic light sheet 192 provides the sizing of the intensity modulated polychromatic light sheet.

Note that on both of these approaches, the modulation and the spectrum extension are inherently resized in synchronization with the resizing of the intensity modulated polychromatic light sheet.

The embodiments where the optical sensor is zoomable and the intensity modulated polychromatic light sheet is resizable are particularly beneficial for handling of varying sample concentrations. A high concentration sample may require shrinking the light sheet (and the modulation period) and zooming in to record only part of the sample, while a low concentration sample may require using an originally sized light sheet and zooming out to record the entire "width" of the sample.

Figure 4:
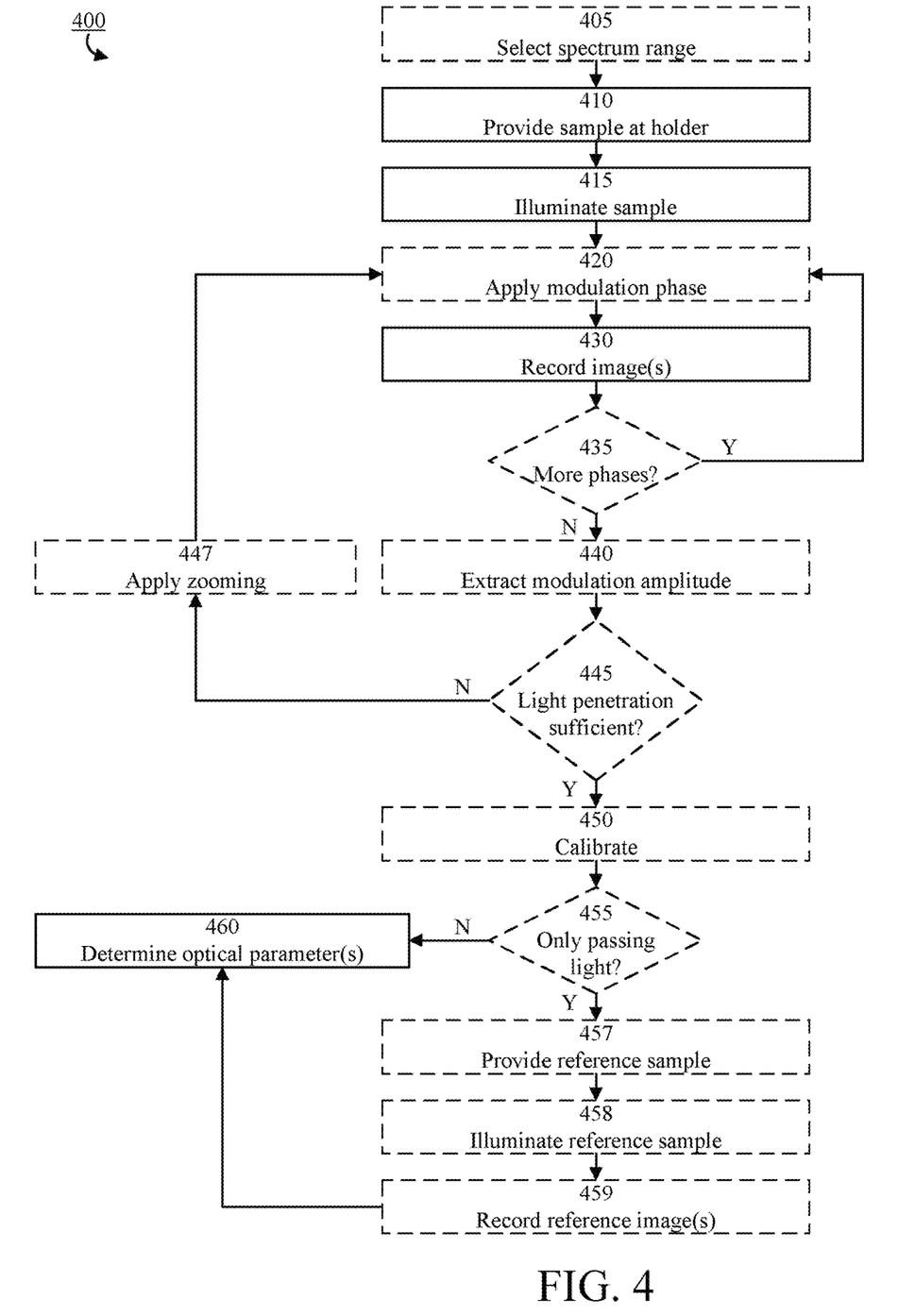
FIG. 4 is a flowchart illustrating example method steps according to some embodiments.

FIG. 4 is a flowchart illustrating an example method 400 of using of an assembly (e.g., any of the assembly variants described in connection with FIGS. 1-3) for measuring one or more optical parameters of a medium.

The method may begin in optional step 405, where a range of a light spectrum of the polychromatic light sheet (e.g., 192) to be generated at the assembly is selected. This may be achieved, for example, by varying the position of a tiltable dispersive element (e.g., 204) as exemplified above in connection with FIG. 2. Another way to achieve the selection of optional step 405 is to remove the dispersive element and insert another dispersive element at its place. Yet another way to achieve the selection of optional step 405 is to employ a dispersive element having two or more parts, wherein different parts result in different dispersions, and wherein the dispersive element is movable to select one of the parts for application (consider analogy with the Ronchi grating 330 of FIG. 3).

In step 410, a sample of the medium is provided at a holder of the assembly, such that (e.g., by location and/or orientation) an intensity modulated polychromatic light sheet to be provided at the assembly will illuminate the sample.

In step 415, the sample is illuminated by the intensity modulated polychromatic light sheet (e.g., by switching on a light source of a light sheet generator configured to provide a polychromatic light sheet being intensity modulated by a light intensity modulator as exemplified above).

As mentioned above in connection with FIGS. 1 and 3, the pattern used in the intensity modulation is periodical and different phases may be applied for different measurements of the same sample. Typically, two or three different phases may be applied. In optional step 420, the intensity modulation may be set to apply the proper phase for the upcoming measurement. This may be achieved, for example, proper movement of a grating (e.g., 330) and/or of an intensity modulation imprinted container, or by proper control of the LCD as exemplified above in connection with FIGS. 1 and 3.

For example, when the intensity modulation pattern is phase shifted to get three different measurements at respective phase shifts, a phase shift of one third of a period of the pattern may be applied.

The modulated illumination enables determination of the single light scattering intensity from the measurement of the modulation amplitude of the recorded signal. Application of different phases (by displacing the modulation) makes it possible to determinate the intensity of the single light scattering for the entire wavelength range at interest.

For example, from images of measurements for different phases, a reconstructed image may be created after image post-processing such that the reconstructed image is free from multiple light scattering intensities and from unwanted reflections. The reconstructed image can thus be used to estimate the extinction coefficient of the medium of the sample more accurately than if multiple light scattering intensities could not be suppressed.

In step 430, at least one image is recorded—by an optical sensor—of intensity of light exiting the sample opposite to the illumination and of intensity of light exiting the sample substantially orthogonal to the polychromatic light sheet as exemplified above in connection with FIG. 1.

If more phases are to be measured (Y-path out of optional step 435), the method returns to 420 where a new phase is applied, and step 430 is repeated for the new phase. If no more phase are to be measured (N-path out of optional step 435), the method proceeds to optional step 440.

In optional step 440, the modulation amplitude is extracted from the recorded images. For example, this may be achieved by post-processing the recoded image(s) and extracting the amplitude of the recorded modulation for both intensity of light exiting the sample opposite to the illumination (detection of transmitted signal) and intensity of light exiting the sample substantially orthogonal to the polychromatic light sheet (side detection). As mentioned above, the modulation amplitude may be used to discriminate between first and higher order scattering, for example.

In optional step 445, it is determined whether the penetration of light into the sample is sufficient for extracting the information at interest from the recorded image(s). For example, optional step 445 may comprise determining whether the extracted modulation amplitude is higher than a threshold value to determine whether the penetration of light into the sample is sufficient.

If the penetration of light into the sample is not sufficient (N-path out of optional step 445), the method may comprise applying zooming in optional step 447, and returning to step 420 for repeating the measurements with the zooming applied. Application of zooming may be achieved, for example, by use of a zooming function for the optical sensor in combination with resizing the initial intensity modulated polychromatic light sheet.

If the penetration of light into the sample is sufficient (Y-path out of optional step 445), the method may continue to optional step 450, where the measurement may be calibrated. For example, the calibration may comprise application of displaceable monochromatic filter(s) (or filters with a relatively narrow bandwidth) to provide spatial calibration of the light spectrum.

If there is scattering and/or photoluminescence, i.e., if light is exiting the sample substantially orthogonal to the polychromatic light sheet, (N-path out of optional step 455) the optical parameter(s) of interest are determined based on the recorded image(s) in step 460. For example, step 460 may comprise extracting optical properties from the "side detection" including deducing the exponential decay if intensity for each wavelength by using the Beer-Lambert law along the direction of light propagation.

If there is no (or very low) scattering and/or photoluminescence, i.e., if light is exiting the sample only opposite to the illumination—only passing light, (Y-path out of optional step 455), then the method continues to optional steps 457, 458 and 459. In these three steps, a reference sample is provided (compare with step 410), the reference sample is illuminated (compare with step 415), and one or more images are recorded for the reference sample (compare with step 430 for light exiting the sample opposite to the illumination). A reference sample may be a sample of a medium with known optical properties. Thereby, measurements performed in step 430 can be put in relation to measurements performed in step 459 to determine the optical parameter(s) of interest based on the recorded image(s) in step 460. For example, step 460 may comprise extracting optical properties from "detection of transmitted signal" using the Beer-Lambert law, measured intensity of the reference sample, and the "width" of the sample (e.g., cuvette path length).

Optional step 455 may, for example, be implemented by comparing the intensity of light exiting the sample opposite to the illumination to a threshold value associated with the intensity of light of the illumination, and concluding that there is no (or very low) scattering and/or photoluminescence if the intensity is above the threshold value.

Some further advantages of various embodiments will now be presented.

Regarding the problem of how to measure the absorption/extinction of light passing through scattering/photoluminescing/turbid media (e.g., liquids), some embodiments use a diffraction grating to generate a polychromatic light sheet and get all the wavelengths in one measurement as exemplified above. Such approaches may be less expensive, and/or enable reduced measurement time, and/or enable a more compact setup, and/or provide more accurate/precise results compared to prior art approaches.

Regarding the problem of how to spatially modulate the light intensity and generate a pattern (e.g., a line pattern) that can be displaced, some embodiments use an LCD screen both to structure the pattern and to displace the pattern. Such approaches may be less expensive, and/or more flexible, and/or more robust compared to prior art approaches.

Regarding the problem of how to change the spectral resolution and fringe size of the modulation depending on the sampled medium, some embodiments provide various ways to resize the modulated light sheet (using a specific resizer, varying the distance between light sheet generator and light intensity modulator, etc.) to provide the necessary resolution. Such approaches may be less expensive, and/or enable high resolution imaging, and/or provide for precise measurements over a wider range of absorption coefficient values compared to prior art approaches.

Regarding the problem of how to obtain light intensity of both light exiting the sample opposite to the illumination (transmitted light) and light exiting the sample substantially orthogonal to the polychromatic light sheet (e.g., scattered light), some embodiments use a reflector (e.g., a white screen) at the exit of the sample to enable recording of the light intensity with a single stationary optical sensor. Such approaches may be less expensive, and/or more robust compared to prior art approaches.

According to some embodiments, it is enabled to perform—using the same assembly—measurements for conventional transmission spectrometer features (with possibly increased precision), measurements for turbid media extinction, and measurements for evaluation of the quantum yield (QY) of fluorescent dyes.

Quantum yield estimation of fluorescent dyes may be achieved based on quantitative measurement of the signal emitted for fluorescents dyes. For example, the estimation may include comparing the raw signal emitted by the dye as a function of the wavelength with the emission of a reference dye with a known QY (RhB for example). Such measurements (the raw signal and/or emission of the reference dye) are typically highly simplified with application of approaches described herein, since there is no need to involve the use of an integration sphere or multiple concentration measurements.

In an example principle of the estimation, the fluorescent signal emitted by a dye can be written $F_s = K_{optic} QY(\lambda)\varepsilon(\lambda) I_0$, where $\lambda$ is the wavelength, $I_0$ is the excitation intensity, $\varepsilon$ is the absorption coefficient of the dye, QY is the quantum yield, and $K_{optic}$ gathers the optical factors such as the collection angle, the chromatic filtering of the lenses, etc. These parameters remain constant between two measurements. Since a reference dye is known (QY and $\varepsilon$), the fluorescence intensity for one wavelength can be written $F_{s_{ref}} = K_{optic} QY_{ref}(\lambda)\varepsilon_{ref}(\lambda)I_0$. Given that the spectrometer allows the measurement of the absorption coefficient $\varepsilon(\lambda)$, the QY can be deduced from the absolute signal intensity $$F_s/F_{s_{ref}} = \frac{QY(\lambda)\varepsilon(\lambda)}{QY_{ref}(\lambda)\varepsilon_{ref}(\lambda)},$$

which means that the QY can be deduced by $$QY(\lambda) = \frac{QY_{ref}(\lambda)\varepsilon_{ref}(\lambda)F_s/F_{s_{ref}}}{\varepsilon(\lambda)}.$$

In some situations, corrections may be beneficial due to, for example, the reabsorption along the collection path and the decay of the excitation intensity.

According to some embodiments of the various approaches presented herein, the intensity modulation may enable removal (or at least suppression) of one or more of: background noise, background reflections, diffused transmitted light.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

LIST OF EXAMPLES

1. An assembly for measurements of one or more optical parameters of a medium, the assembly comprising:
    a light sheet generator (110, 210) configured to provide a polychromatic light sheet (192, 292) comprising a light spectrum extending in a first spatial dimension (101), wherein the polychromatic light sheet has a propagation path in a second spatial dimension (102);
    a light intensity modulator (130, 330) configured to provide an intensity modulated polychromatic light sheet (193, 193a) by applying—to the polychromatic light sheet—an intensity modulation having a periodical, or substantially periodical, pattern in the first spatial dimension;
    a holder (145) for a sample (140) of the medium, configured to enable the intensity modulated polychromatic light sheet to illuminate the sample; and an optical sensor (161, 162) configured to record intensity of light (194, 195) exiting the sample over the light spectrum for provision of the one or more optical parameters.
2. The assembly of example 1, wherein the periodical pattern is selected from a plurality of periodical patterns (331, 332) available to the light intensity modulator, wherein at least one of the periodical patterns is phase shifted in relation to another one of the periodical patterns in the first spatial dimension.
3. The assembly of any of examples 1 through 2, wherein the light intensity modulator (130) comprises a liquid crystal display, LCD.
4. The assembly of any of examples 1 through 3, wherein the light sheet generator (110, 210) comprises a light source (203) configured to provide white light, a dispersive element (204) configured to spread the white light in the first spatial dimension to provide the light spectrum, and an optical slit (205) extending in the first spatial dimension configured to provide the polychromatic light sheet by limitation of the spread white light.
5. The assembly of example 4, wherein the dispersive element (204) is tiltable for varying a range of the light spectrum of the polychromatic light sheet.
6. The assembly of any of examples 1 through 5, wherein the optical sensor (161, 162) is configured to record the intensity of light (195) exiting the sample substantially orthogonal to the polychromatic light sheet and/or to record the intensity of light (194) exiting the sample opposite to the illumination.
7. The assembly of any of examples 1 through 6, further comprising an optical reflector (150) in the propagation path of the polychromatic light sheet along the second spatial dimension, the optical reflector configured to reflect—towards the optical sensor (162)—light (194) of the intensity modulated polychromatic light sheet exiting the sample opposite to the illumination.
8. The assembly of any of examples 1 through 7, wherein the optical sensor (162) is configured to record the intensity of light (195) exiting the sample substantially orthogonal to the polychromatic light sheet, and configurable to switch between recording light intensity variations along an entire width of the sample and recording light intensity variations along a part of the width of the sample, and wherein the assembly comprises a light sheet resizer (135) configured to provide the intensity modulated polychromatic light sheet (193, 193*a*) in one of a plurality of available extensions in the first spatial dimension.
9. The assembly of any of examples 1 through 8, further comprising two or more displaceable monochromatic filters (106) configured to provide spatial calibration of the light spectrum.
10. A method of using the assembly according to any of examples 1 through 9 for measuring one or more optical parameters of a medium, the method comprising:
providing (410) the holder with a sample of the medium;
illuminating (415) the sample by the intensity modulated polychromatic light sheet provided by the light sheet generator and the light intensity modulator of the assembly;
recording (430), by the optical sensor of the assembly, at least one image of intensity of light (194) exiting the sample opposite to the illumination and intensity of light (195) exiting the sample substantially orthogonal to the polychromatic light sheet; and
determining (460) the one or more optical parameters based on the recorded at least one image.

The invention claimed is:
1. An assembly for measurements of one or more optical parameters of a medium, the assembly comprising:
a light sheet generator configured to provide a polychromatic light sheet comprising a light spectrum extending in a first spatial dimension, wherein the polychromatic light sheet has a propagation path in a second spatial dimension, wherein the light sheet generator comprises a light source configured to provide white light, a dispersive element configured to spread the white light in the first spatial dimension to provide the light spectrum, and an optical slit extending in the first spatial dimension configured to provide the polychromatic light sheet by limitation of the spread white light;
a light intensity modulator configured to provide an intensity modulated polychromatic light sheet by applying—to the polychromatic light sheet—an intensity modulation having a periodical, or substantially periodical, pattern in the first spatial dimension;
a holder for a sample of the medium, configured to enable the intensity modulated polychromatic light sheet to illuminate the sample; and
an optical sensor configured to record intensity of light exiting the sample over the light spectrum for provision of the one or more optical parameters.
2. The assembly of claim 1, wherein the periodical pattern is selected from a plurality of periodical patterns available to the light intensity modulator, wherein at least one of the periodical patterns is phase shifted in relation to another one of the periodical patterns in the first spatial dimension.
3. The assembly of claim 1, wherein the light intensity modulator comprises a liquid crystal display, LCD.
4. The assembly of claim 1, wherein the dispersive element is tiltable for varying a range of the light spectrum of the polychromatic light sheet.
5. The assembly of claim 1, wherein the optical sensor is configured to record the intensity of light exiting the sample substantially orthogonal to the polychromatic light sheet and/or to record the intensity of light exiting the sample opposite to the illumination.
6. The assembly of claim 1, further comprising an optical reflector in the propagation path of the polychromatic light sheet along the second spatial dimension, the optical reflector configured to reflect—towards the optical sensor—light of the intensity modulated polychromatic light sheet exiting the sample opposite to the illumination.
7. The assembly of claim 1, wherein the optical sensor is configured to record the intensity of light exiting the sample substantially orthogonal to the polychromatic light sheet, and configurable to switch between recording light intensity variations along an entire width of the sample and recording light intensity variations along a part of the width of the sample, and wherein the assembly comprises a light sheet resizer configured to provide the intensity modulated polychromatic light sheet in one of a plurality of available extensions in the first spatial dimension.
8. The assembly of claim 1, further comprising two or more displaceable monochromatic filters configured to provide spatial calibration of the light spectrum.
9. A method of using the assembly according to claim 1 for measuring one or more optical parameters of a medium, the method comprising:
providing the holder with a sample of the medium;

illuminating the sample by the intensity modulated polychromatic light sheet provided by the light sheet generator and the light intensity modulator of the assembly;

recording by the optical sensor of the assembly, at least one image of intensity of light exiting the sample opposite to the illumination and intensity of light exiting the sample substantially orthogonal to the polychromatic light sheet; and determining the one or more optical parameters based on the recorded at least one image.

* * * * *